Figure 3:
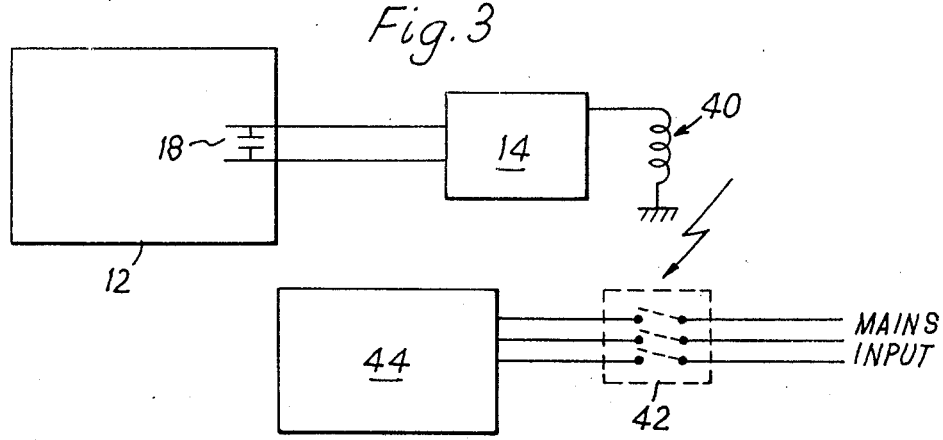

United States Patent
Hodson et al.

[11] 3,927,356
[45] Dec. 16, 1975

[54] YARN DETECTION DEVICES

[75] Inventors: David George Hodson, Sherwood; Derek Peat, Aspley, both of England

[73] Assignee: National Research Development Corporation, London, England

[22] Filed: July 11, 1974

[21] Appl. No.: 487,759

[30] Foreign Application Priority Data
July 13, 1973 United Kingdom.............. 33564/73

[52] U.S. Cl.......... 317/123; 317/DIG. 2; 317/262 R
[51] Int. Cl.²......................................... H01H 47/00
[58] Field of Search.......... 317/123, DIG. 2, 262 R, 317/2 R, 262 A; 324/32

[56] References Cited
UNITED STATES PATENTS

| | | | |
|---|---|---|---|
| 3,667,036 | 5/1972 | Seachman............................ | 324/32 |
| 3,753,102 | 8/1973 | Beck..................................... | 324/32 |
| 3,766,404 | 10/1973 | Larson et al.................. | 317/DIG. 2 |
| 3,772,592 | 11/1973 | Rhodes................................. | 324/32 |
| 3,787,706 | 1/1974 | DeGeest............................ | 317/2 R |
| 3,813,583 | 5/1974 | Akiyama....................... | 317/DIG. 2 |

*Primary Examiner*—L. T. Hix
*Attorney, Agent, or Firm*—Cushman, Darby & Cushman

[57] ABSTRACT

A detection apparatus for detecting static charge on a moving yarn or the like. The apparatus includes an amplifier which amplifies signals produced by the detector on detection of the static charge. A cut-off unit only passes signals from the amplifier of some predetermined amplitude which is greater than that associated with electronic noise in the cut-off unit input signal. Various designs of multi-electrode detector are described.

12 Claims, 7 Drawing Figures

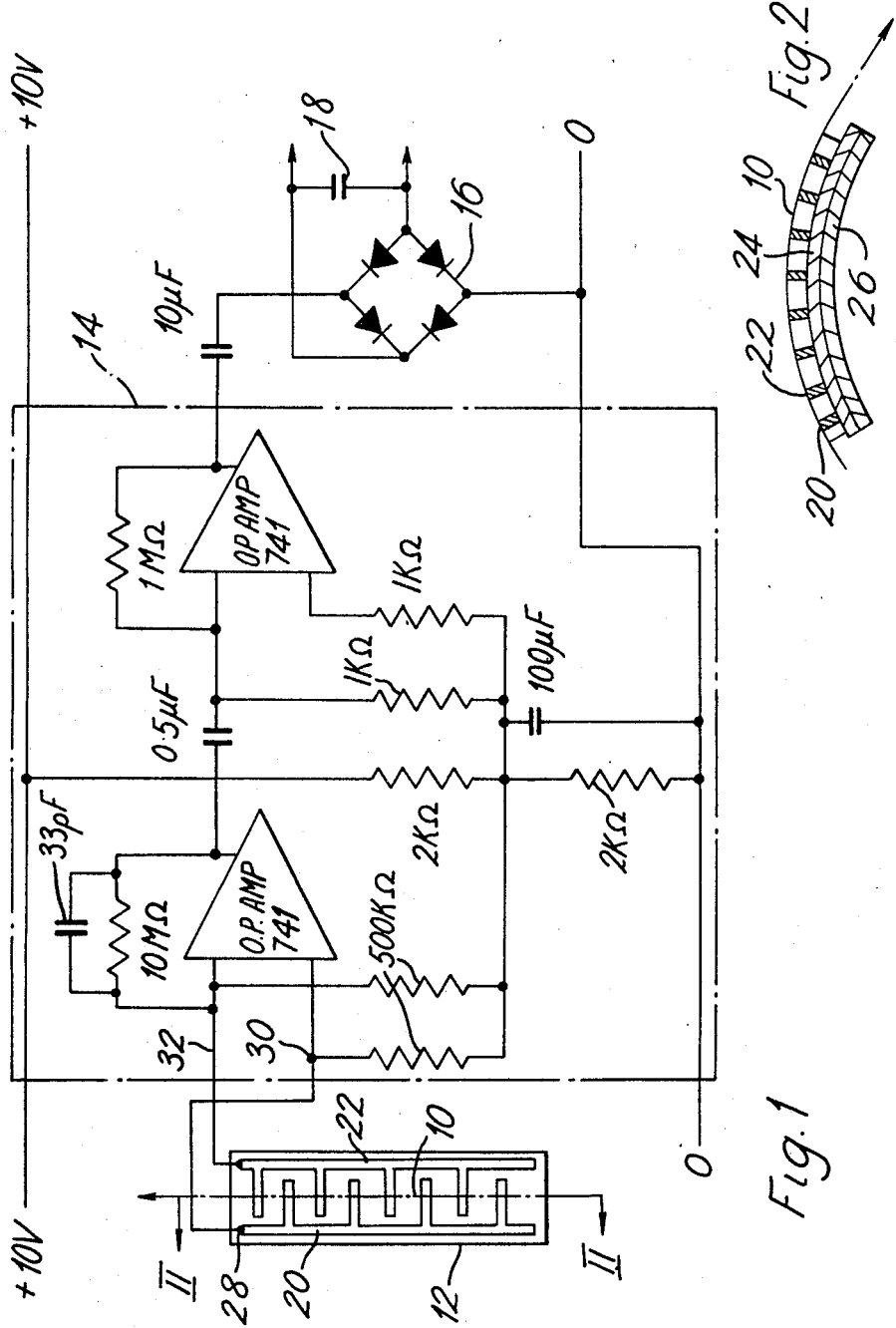

YARN DETECTION DEVICES

The present invention relates to a method of detecting moving yarn or any like charge-bearing material e.g., plastics covered wires. In particular, but not exclusively, the invention relates to yarn detection in industrial knitting machines. In such machines it is very important to have some sort of yarn detection system because the speed of operation of the machine is such that a large amount of yarn would be used before a fault in the final product issuing from the machine could be detected and the machine stopped. Mechanical detection devices are already known in which some part of the detection device makes contact with the moving yarn but the effect of this contact is to apply a retarding force on the yarn which lowers the efficiency of the machine.

According to the present invention a detection apparatus comprises a multi-electrode detector for detecting static charge on a moving yarn or the like, an amplifier for amplifying signals produced by the detector on detection of said charge, and a cut-off unit adapted to pass signals from the amplifier in excess of some predetermined amplitude which is greater than that associated with electronic noise in the cut-off unit input signal.

The electrodes of the multi-electrode detector are spaced apart along a path to be traversed by the yarn or the like to be detected in operation of the device. The electrodes will normally be identical to one another and they should be uniformly spaced apart. There are preferably not less than eight such electrodes. They are preferably electrically connected as two sets (e.g., four electrodes each) with the electrodes of one set positioned between those of the other set.

The inter-electrode spacing (distance between like regions of adjacent electrodes) is conveniently between 0.1 and 0.4 inches, preferably 0.2 inches.

The ratio of the "thickness" of each electrode (measured in the direction of yarn movement past the electrode) to the interelectrode spacing (as defined above) should preferably not be more than 1:4.

In one embodiment of the invention, the amplifier has a gain such that the amplifier together with the cut-off unit produces zero output for an input of $5 \times 10^{-12}$ amps and less. Such an amplifier would be of the type known as a "high gain" amplifier.

Figure 4:
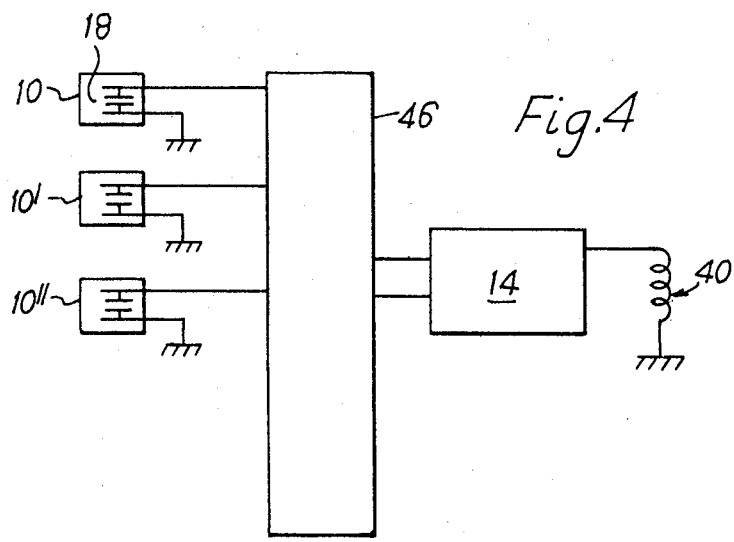
Figure 7:
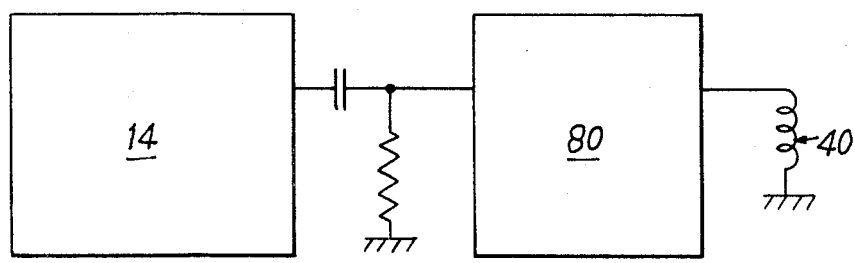
Figure 5:
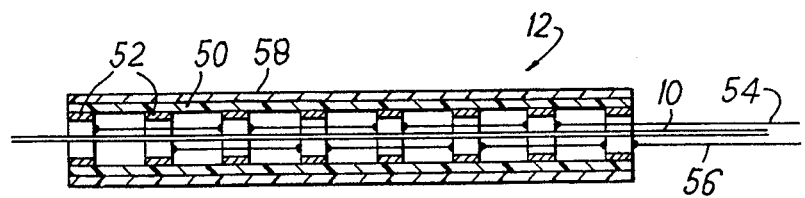
Figure 6:
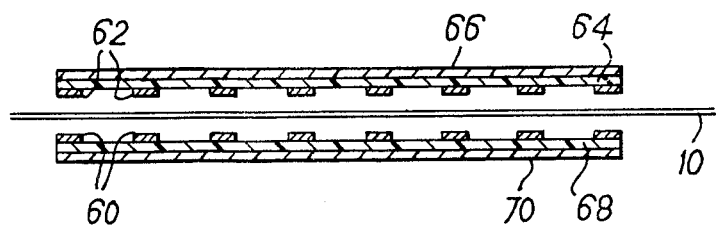

Embodiments of the invention will now be described by way of example with reference to the accompanying drawings in which FIG. 1 shows a first embodiment; FIG. 2 shows a cross-section taken along the line II — II in FIG. 1; FIG. 3 shows a second embodiment; FIGS. 4 and 7 show parts of other embodiments; and FIGS. 5 and 6 show alternative forms of detector to that shown in FIGS. 1 and 2.

Referring first to FIGS. 1 and 2, a yarn 10 is moving over a multi-electrode detector 12 which sends current pulses to amplifier 14 in response to detected charge on the yarn. A 4-diode rectifier bridge 16 passes only signals in excess of some predetermined D.C. value (½ volt in the illustrated circuit) in excess of those associated with electronic noise in amplifier 14. The output from the bridge therefore represents static noise produced in detector 12 by charge present on the yarn 10.

In a second embodiment (FIG. 3), this output is fed (via smoothing condenser 18) into a relay system 40, 42 which stops the machine (44) if the bridge output fell to zero (indicative of the yarn breaking).

In another embodiment (FIG. 4) the detection device is one of several such devices of which only three (10, 10', 10'') are shown and the output from these devices is fed to a logic "AND" gate 46. Thus if in operation one yarn breaks, this causes one input to disappear and the gate 46 operates a relay system to stop the machine. Only the coils 40 of the relay system are shown in FIG. 4, the rest of the system being connected up with the machine in an identical fashion to that shown in the lower half of FIG. 3.

The detailed design of amplifier 14 will be clear from FIG. 1. The term "OP.AMP" used in that Figure indicates an "operational amplifier" i.e., an amplifier which amplifies the difference of its input signals. The numeral 741 after this term indicates the type of operational amplifier used. This is a very common type which is made by leading integrated circuit manufacturers such as Mullard, Texas Instruments, Signetics, etc., and the full specifications are readily available from these manufacturers. Although many other designs for amplifier 14 are of course possible, the amplifier should always produce less electronic noise than the static noise picked up by detector 12 from the yarn 10. Thus for any particular yarn, trials have to be carried out with the yarn to determine the minimum level of static which exists on the yarn. The results of the trials will determine whether the first operational amplifier can be a normal type, say the 741 or whether it has to be a low noise version e.g., the National type LM725. If this precaution is not taken, then the cut-off unit (bridge 16 in this instance) will be unable to separate out the noise component associated with static charge on the yarn and there will be no way of making the system responsive to the absence of yarn over detector 12.

Because the electric current induced in the electrodes is roughly proportional to the variation in charge along the length of the yarn and the speed of the yarn, the most demanding situation will be the detection of low speed (e.g., 300 feet/minute) "antistatic" yarns i.e., those particular synthetic yarns which are so produced as to inherently reduce the amount of static electricity generated on and retained by them 'CELON' by Courtaulds and 'ULTRON' by Monsanto are examples. A high gain amplifier as already discussed should be able to deal with such situations however. If faster yarn speeds or different yarn types are only going to be encountered then obviously a correspondingly lower gain amplifier can be used. For yarn speeds less than 300 feet/minute the demands on the amplifier 14 would be such that the use might have to be considered of specially manufactured electronic components such as the National type LM725 amplifier referred to earlier.

The reason for using a multi-electrode detector instead of using a single electrode detector is that in the former the signals from the individual electrodes are added together to produce a larger output signal in response to charge on the yarn. For example a 20 electrode detector will produce about five times the output (noise) signal that could be obtained with a single electrode detector. This enables the signal from the detector to be made sufficiently greater than the amplifier noise signal for detection at a later stage.

The actual design of the multi-electrode detector is not critical but as indicated earlier it is preferable to have the electrodes electrically connected as two sets with the electrodes of one set positioned between those of the other set. The outputs from these two sets are fed into amplifier 14. In the embodiment illustrated in the drawing for example, each set takes the form of a comb 20, 22 of electrically conducting material e.g., copper, about 1/16th inch thick and backed by a layer 24 of insulating material such as glass fibre board on an earthed metal plate 26 which is arcuate in side elevation as may be seen in FIG. 2. FIG. 2 is not to scale and the curvature of the detector surface would be much less than that shown in FIG. 2. About 5° total change of angle from one end of the detector to the other would be a typical curvature in practice. The other dimensions of the comb can be seen from FIG. 1 in which the detector 12 is shown full size and to scale. The same comb can be used irrespective of the type of yarn 10 involved. The function of plate 26 is to reduce the airborne interference picked up by the combs.

The idea of having the detector surface curved is that the yarn can be passed under tension over the surface so that yarn vibration perpendicularly of the detector is virtually illuminated. This avoids variation occurring in the detector signal due to alteration of the yarn-electrode distance as the yarn vibrates. An alternative design of detector to that shown in FIGS. 1 and 2 can be made by using printed circuit techniques. The "plan" dimensions of the printed circuit detector can be the same as those shown in FIG. 1 for detector 10.

If the yarn speed is so low that vibration is no problem, then the detector shown in FIGS. 1 and 2 or the printed circuit version referred to above can be modified by having the electrodes arranged on a flat surface rather than an arcuate one.

An alternative form of detector 12 (FIG. 5) comprises a tube 50 of insulating material at the interior of which are eight discrete rings (such as rings 52) of electrically-conductive material uniformly spaced along the tube. The yarn 10 to be detected is passed through the tube and, as each electrode 52 surrounds the yarn, vibration of the yarn will make no overall difference to the detected signal. As before, alternate electrodes are electrically connected as two sets the outputs from which are fed via leads 54, 56 into amplifier 14 in the way above described. Reference numeral 58 indicates a conducting shield. In a variation of this last design of detector, the electrodes are electrically connected together as a single set. In this case connection 28–30 is omitted from the circuit shown in FIG. 1 and the output signal from the detector is fed into the other input 32 of amplifier 14.

FIG. 6 shows another embodiment in which the electrodes e.g., electrodes 60, 62 are of bar form and each extend perpendicularly in the direction of motion of yarn 10. One group of these electrodes (containing electrodes 60) is located in a plane on one side of the yarn path and the remaining electrodes (containing electrodes 62) from a second group located on the other side of the yarn path. It will be seen that each electrode from the first group is opposite to an electrode from the second group and the electrodes are connected up to provide a first set provided by alternate pairs of oppositely located electrodes from the two groups and a second set provided by the remaining electrodes.

It is not essential to use a rectifier as the cut-off unit in the circuits described above. For example a non-rectifying level detector could be used and the pulses from the level detector (indicative of charge on the yarn) could have their shape elongated with a pulse stretcher circuit. These modified pulses could then be used to operate the relay etc. as described earlier. FIG. 7 shows part of one such arrangement in which the output of the detector 14 is fed via a retriggerable monostable circuit 80 which in turn feeds the coils 40 of a relay system. As with the embodiment of FIG. 4, the rest of the relay system is connected up with the machine in an identical fashion to that shown in the lower half of FIG. 3.

We claim:

1. A detection apparatus comprising a multi-electrode detector for detecting static charge on a moving yarn or the like, an amplifier for amplifying signals produced by the detector on detection of said charge, and a cut-off unit adapted to pass signals from the amplifier in excess of some predetermined amplitude which is greater than that associated with electronic noise in the cut-off unit input signal.

2. An apparatus as claimed in claim 1 having not less than eight electrodes.

3. An apparatus as claimed in claim 1 in which the electrodes are electrically connected as two sets with the electrodes of one set positioned between those of the other set.

4. An apparatus as claimed in claim 1 in which the interelectrode spacing as hereinbefore defined, is between 0.1 and 0.4 inches.

5. An apparatus as claimed in claim 1 in which the thickness of each electrode, measured in the direction of yarn movement past the electrode, to the inter-electrode spacing, as hereinbefore defined, is not more than 1:4.

6. An apparatus as claimed in claim 1 in which the amplifier has a gain such that the amplifier together with the cut-off unit produces zero output for an input of $5 \times 10^{-12}$ amps and less.

7. An apparatus as claimed in claim 1 in which the output from the detector is fed into a relay system which stops the machine if the output of the cut-off unit falls to zero.

8. An apparatus as claimed in claim 1 in which the detector is one of several such detectors, and the output of the cut-off unit is fed to one of a series of logic "AND" gates whereby if one yarn breaks causing one input to disappear, the associated gate operates a relay to stop the machine.

9. An apparatus as claimed in claim 3 in which the electrodes are of interpenetrating comb form, each comb being provided by one of the two sets of electrodes.

10. An apparatus as claimed in claim 3 in which the electrodes are all of ring form and are spaced apart along a common axis of the rings.

11. An apparatus as claimed in claim 3 in which the electrodes are of bar form each extending perpendicularly to the direction of motion of the yarn, the electrodes being arranged as a first group located in a plane on one side of the yarn path and as a second group located on the other side of the yarn path, each electrode from the first group being opposite to an electrode from the second group, and the first set of electrodes being provided by alternate pairs of oppositely located electrodes and the second group provided by the remaining electrodes.

12. Apparatus as in claim 4 in which said interelectrode spacing is about 0.2 inches.

* * * * *